UNITED STATES PATENT OFFICE.

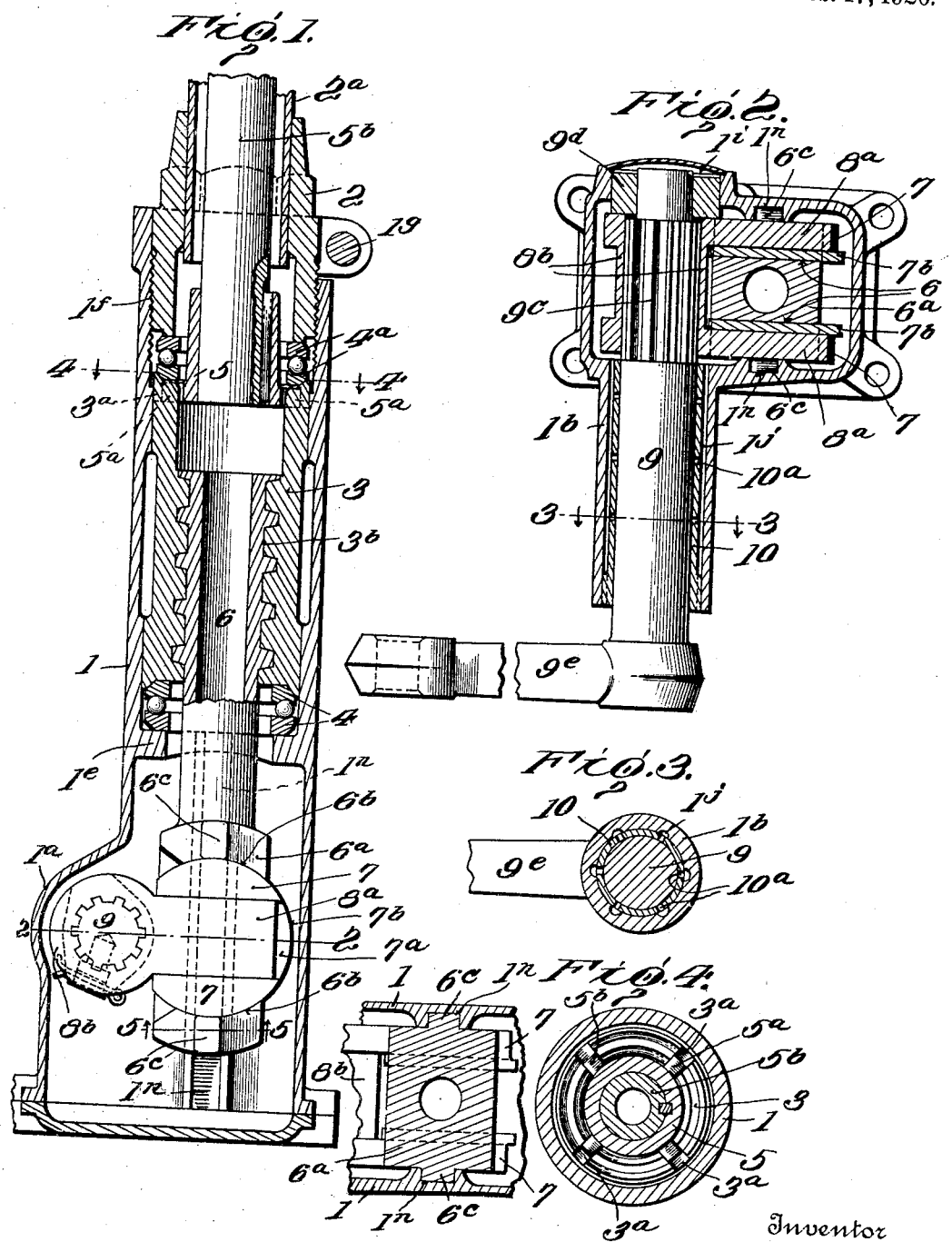

DAVID E. ROSS, OF LA FAYETTE, INDIANA, ASSIGNOR TO ROSS GEAR AND TOOL COMPANY, OF LA FAYETTE, INDIANA, A CORPORATION OF INDIANA.

STEERING-GEAR.

1,331,026.

Specification of Letters Patent.

Patented Feb. 17, 1920.

Application filed February 20, 1919. Serial No. 278,251.

*To all whom it may concern:*

Be it known that I, DAVID E. ROSS, a citizen of the United States, residing at La Fayette, in the county of Tippecanoe and State of Indiana, have invented certain new and useful Improvements in Steering-Gears; and I hereby declare that the following is a full, clear, and exact description thereof, reference being had to the accompanying drawings, which form part of this specification.

This invention relates to steering gears, and its object is to provide a novel gear whereby the steering crank or rock shaft connected with the steering wheels of a vehicle can be easily and powerfully positively actuated from the steering wheel; and which will hold the steering shaft securely in adjusted position.

The novel features of the invention and some of its practical advantages will be clearly understood from the following description thereof in connection with the accompanying drawings which illustrate one practical embodiment of the invention. The invention is capable of embodiment in various forms so far as the construction of the parts and the housing thereof is concerned; and the essential features of the invention and novel constructions and combinations of parts for which protection is desired are summarized in the claims:

In said drawings:

Figure 1 is a longitudinal sectional view through a steering gear embodying the invention, parts being shown in elevation.

Fig. 2 is a transverse section on line 2—2, Fig. 1.

Fig. 3 is a detail section on line 3—3, Fig. 2.

Fig. 4 is a transverse section on line 4—4, Fig. 1, and

Fig. 5 is a detail section on line 5—5, Fig. 1.

The casing of the steering gear may be of any suitable construction. The main body 1 of the casing is tubular and is preferably cylindric in cross section and is shown as provided at one side near one end with an offset portion $1^a$ which has a lateral tubular projection $1^b$ in which is journaled the rock shaft 9, hereinafter referred to.

The body 1 of the casing is provided with an internal shoulder $1^e$ above the offset $1^a$; and in its upper end is preferably adjustably secured a head or bushing member 2 of any suitable construction. In the particular form illustrated the upper end of the casing is internally screw threaded as at $1^f$ for the engagement of a tubular bushing member, which may be locked therein, when adjusted, by any suitable means, as by partly splitting the upper end of the casing and clamping the split portion on the bushing by a bolt, indicated at $1^g$ in Fig. 1. Such means of fastening the bushing is old and not claimed herein. In this bushing 2 is fitted or secured the lower end of a tube $2^a$ through which the steering shaft $5^b$ extends. Mounted in the part 1 of the casing is a rotatable sleeve 3 which is confined against longitudinal movement in the casing between the shoulder $1^e$ and the bushing 2. Preferably ball thrust bearings 4 and $4^a$ are interposed between the ends of the sleeve 3 and the shoulder $1^e$ and bushing 2 respectively; so that the sleeve while held securely in the casing can be readily rotated. The sleeve is provided with internal screw threads in its bore, as shown at $3^b$, adapted to engage external threads on one end of a longitudinally movable member 6 which enters one end of the sleeve.

The sleeve 3 may be rotated in any suitable manner. As shown it is preferably provided on its upper end with radial slots $3^a$ which are adapted to be engaged by radially disposed lugs $5^a$ on a collar 5 non-rotatably attached to the end of the steering shaft $5^b$ (see Figs. 1 and 4). The collar is shown as splined to the shaft $5^b$, but it may be attached thereto in any other desired manner.

The member 6 projects below the lower end of the sleeve 3, and has on its lower end, outside the sleeve, an enlarged head $6^a$ which is preferably provided with parti-cylindric recesses $6^b$, in which are fitted rocking segments 7, separated by a transverse space, or groove $7^a$, and said segments are disposed on opposite sides of and engage crank fingers or arms $8^a$ formed on or attached to the rock shaft 9. I prefer to connect the opposite parti-cylindric segments 7 at opposite sides of each arm $8^a$ by a web $7^b$ as shown.

As shown the head $6^a$ has a recess $6^b$ in each of its opposite sides, and the rock shaft 9 has two arms $8^a$ engaging the segments in said recesses. These arms $8^a$ may be formed with a sleeve $8^b$ that is non-rotatably attached to the end of the rock shaft 9 in any suitable way. As shown the end of the rock shaft has longitudinal grooves or keyways 9$^c$ engaging corresponding internal keyways in the sleeve 8$^b$, providing a secure means for preventing rotation of the sleeve on the rock shaft and causing the arms and shaft to move as one.

The shaft 6 should be prevented from turning axially in the casing by any suitable means. As shown its head 6$^a$ is provided on its opposite sides with laterally projecting lugs 6$^c$, at opposite sides of the recesses 6$^b$; and said lugs engage longitudinal channels or guides 1$^n$ which may be formed in the adjacent sides of the part 1 of the casing. These effectively prevent the actuating member rotating on its axis in the casing but permit it to move longitudinally therein.

The rock shaft 9 is provided on its outer end with a crank arm 9$^e$ which may be connected in the usual manner to the steering wheels of a vehicle, or to any other member which it is desired to move or control by the gear.

The shaft 9 is journaled in the bearing 1$^b$ and in the bushing 9$^d$ inserted in an opening in the side of the casing opposite the journal 1$^b$; which opening may be closed by a cap plate 1$^i$.

Preferably a bushing 10 surrounds the part of the shaft 9 within the bearing 1$^b$, and is provided with radial perforations 10$^a$ that communicate with longitudinal channels 1$^j$ formed in the bore of parts 1$^b$, whereby oil may be readily supplied from the interior of the casing to the journal bearing of the rock shaft 9.

The casing should be tightly closed when in use; and it can be filled with oil to lubricate all the working parts therein.

It will be seen that each segment 7 has a substantial bearing surface both against the wall of the recess 6$^b$ within which it is placed and also against the opposed surface of the crank arm 8$^a$ entering such recess; and the segments 7 prevent lateral play between the arms 8$^a$ and head 6$^a$ of the member 6, and at the same time cause the arms to rock the shaft 9 if member 6 is moved longitudinally in either direction.

The segments 7 automatically adjust themselves in the circular recesses 6$^b$ as the member 6 is reciprocated; and the crank arms 8$^a$ automatically adjust themselves longitudinally and radially of the segments or disks according to the movement of the member 6. While I have shown the adjacent segments 7 as united to form a cylindric transversely grooved disk they might be formed separate. Also while I prefer to use the segments and crank arms to operatively engage the rock shaft with the member 6 other engaging connections might be employed in some cases.

It will be seen that in this invention the member 6 has a longitudinal movement in the casing, and partly within the sleeve 3; while sleeve 3 is rotatable in the casing but confined against longitudinal movement therein. With this construction the threads can be more readily cut in the parts; perfect alinement of all the working parts can be more easily secured; and the cost of manufacture is lessened.

What I claim is:

1. In a steering gear of the character specified, a casing, an internally threaded sleeve rotatably mounted in said casing but longitudinally immovable therein, said sleeve having radially disposed slots in its upper end, a steering shaft, a collar on said steering shaft having radially disposed lugs engaging the slots in the sleeve; a rock shaft journaled in the casing, a member having one end entered into the sleeve and provided with exterior threads engaging the interior threads of the sleeve and operative connections between said member and the rock shaft whereby when the sleeve is rotated the member is shifted and the shaft rocked.

2. In a steering gear, a casing; an internally threaded sleeve rotatably mounted in said casing, means for preventing longitudinal movement of the sleeve in the casing, a rock shaft journaled in the casing provided with a crank arm, a member having one end provided with exterior threads engaging the interior threads of the sleeve and having a head exterior to the sleeve provided with a recess in its side engaged by the crank arm on the rock shaft, and segments interposed between the sides of the crank arm and the side walls of the recess, whereby when the sleeve is rotated the member is shifted and the shaft rocked.

3. In a steering gear, a casing, an internally threaded sleeve rotatably mounted in said casing, said sleeve having radially disposed slots in its upper end, a steering shaft, a collar on said steering shaft having radially disposed lugs engaging the slots in the sleeve, means for preventing longitudinal movement of the sleeve in the casing, a rock shaft journaled in the casing, a member having one end entered into the sleeve and provided with exterior threads engaging the interior threads of the sleeve and having a head provided with lugs on its side engaging grooves in the adjacent sides of the casing to prevent rotation of said member when the sleeve is turned; and means operatively engaging the rock shaft with the head, whereby when the sleeve is rotated the member is shifted and the shaft rocked.

4. In a steering gear, a casing, an internally threaded sleeve rotatably mounted in said casing having radially disposed slots in its upper end, means for preventing longitudinal movement of the sleeve in the casing, a rock shaft journaled in the casing provided with a crank arm, a member having one end entered into the sleeve and provided with exterior threads engaging the interior threads of the sleeve and having a head engaging the crank arm on the rock shaft, said head having lugs on its sides engaging grooves in the adjacent sides of the casing to prevent rotation of said member when the sleeve is turned; a steering shaft, and a collar on said steering shaft having radially disposed lugs engaging the slots in the sleeve, whereby when the sleeve is rotated the member is shifted and the shaft rocked.

5. In a steering gear the combination of a casing having a tubular portion provided with an offset portion at one end, a lateral projection from said offset, an internal shoulder above the offset portion, and its upper end screw threaded; a bushing adjustably fitted to the upper threaded end of the casing; an internally threaded sleeve rotatably mounted within the casing between the shoulder and bushing; a rock shaft journaled in the lateral projection; a member within the casing having one end exteriorly screw threaded and entered into the threaded portion of the sleeve and having its outer end provided with a head; and means operatively connecting said head with said rock shaft.

6. In a steering gear the combination of a casing having a tubular portion provided with an offset portion at one end, a lateral projection from said offset, an internal shoulder above the offset portion, and its upper end screw threaded; a bushing adjustably fitted to the upper threaded end of the casing; an internally threaded sleeve rotatably mounted within the casing between the shoulder and bushing, ball thrust bearings interposed between the ends of the sleeve and the shoulder and bushing, a rock shaft journaled in the lateral projection, a member within the casing having one end exteriorly screw threaded and entered into the threaded portion of the sleeve and having its outer end provided with a head; and means operatively connecting said head with said rock shaft.

7. In a steering gear the combination of a casing having a tubular portion provided with an offset portion at one end, a lateral projection from said offset, an internal shoulder above the offset portion, and its upper end screw threaded; a bushing adjustably fitted to the upper threaded end of the casing; an internally threaded sleeve rotatably mounted within the casing between the shoulder and bushing; a rock shaft journaled in the lateral projection; a member within the casing having one end exteriorly screw threaded and entered into the threaded portion of the sleeve and having its outer end provided with a head; said head having lugs on its sides engaging grooves in the adjacent sides of the casing to prevent rotation of said member when the sleeve is turned; and means operatively connecting said head with said rock shaft.

8. In a steering gear the combination of a casing having a tubular portion provided with an offset portion at one end, a lateral projection from said offset, an internal shoulder above the offset portion, and its upper end screw threaded; a bushing adjustably fitted to the upper threaded end of the casing; an internally threaded sleeve rotatably mounted within the casing between the shoulder and bushing, said sleeve having radially disposed slots in its upper end; a steering shaft; a collar on said steering shaft having radially disposed lugs engaging the slots in the sleeve; a rock shaft journaled in the lateral projection; a member within the casing having one end exteriorly screw threaded and entered into the threaded portion of the sleeve and having its outer end provided with a head; and means operatively connecting said head with said rock shaft.

9. In a steering gear the combination of a casing having a tubular portion provided with an offset portion at one end, a lateral projection from said offset, an internal shoulder above the offset portion, and its upper end screw threaded; a bushing adjustably fitted to the upper threaded end of the casing; an internally threaded sleeve rotatably mounted within the casing between the shoulder and bushing; said sleeve having radially disposed slots in its upper end; a steering shaft; a collar on said steering shaft having radially disposed lugs engaging the slots in the sleeve; a rock shaft journaled in the lateral projection; a member within the casing having one end exteriorly screw threaded and entered into the threaded portion of the sleeve and having its outer end provided with a head; said head having lugs on its sides engaging grooves in the adjacent sides of the casing to prevent rotation of said member when the sleeve is turned; and means operatively connecting said head with said rock shaft.

10. In a steering gear the combination of a casing having a tubular portion provided with an offset portion at one end and a lateral projection from said offset, an internal shoulder above the offset portion, and its upper end screw threaded; a bushing adjustably fitted to the upper threaded end of the casing; an internally threaded sleeve rotatably mounted within the casing between the shoulder and bushing; a rock shaft journaled in the offset, a member within the casing having one end exteriorly screw threaded and entered into the threaded portion of the sleeve, and having its outer end provided with a head being provided with circular recesses on its opposite sides; and having lateral projections or lugs on its opposite sides engaging opposed grooves in the interior walls of the casing to prevent the member turning when the sleeve is rotated; crank arms on the rock shaft entering said recesses, and segments fitted in said recesses at opposite sides of the crank arms entered therein; and means for turning the sleeve.

11. In a steering gear the combination of a casing having a tubular portion provided with an offset portion at one end, a lateral projection from said offset, an internal shoulder above the offset portion, and its upper end screw threaded; a bushing adjustably fitted to the upper threaded end of the casing; an internally threaded sleeve rotatably mounted within the casing between the shoulder and bushing; ball thrust-bearings interposed between the ends of the sleeve and the shoulder and bushing; a rock shaft journaled in the offset; a member within the casing having one end exteriorly screw threaded and entered into the threaded portion of the sleeve, and having its outer end provided with a head; said head being provided with circular recesses on its opposite sides; and also provided on opposite sides with projections or lugs engaging opposed grooves in the interior walls of the casing to prevent the member turning when the sleeve is rotated; crank arms on the rock shaft entering said recesses; segments fitted in said recesses at opposite sides of the crank arms entered therein; and means for turning the sleeve.

12. In a steering gear of the character specified, a casing having grooves in its sides near one end, an internally threaded sleeve rotatably mounted in said casing but longitudinally immovable therein, a rock shaft journaled in the casing, a member in the casing having one end entered into the sleeve and provided with exterior threads engaging the interior threads of the sleeve and having a head on its end outside of the sleeve, said head having lugs on its side engaging the grooves in the adjacent sides of the casing to prevent rotation of said member when the sleeve is turned.

13. In a steering gear, a casing, an internally threaded sleeve rotatively mounted therein; means within the casing to prevent end motion of said sleeve; and means entering the casing and detachably engaged with said sleeve for rotating said sleeve; with a rock shaft journaled in said casing; a member having one end entered into the sleeve and provided with external threads engaging the internal threads of the sleeve; co-acting means on the head and casing to prevent rotation of the member when the sleeve is turned; and means operatively engaging the rocker shaft with the head, whereby when the sleeve is rotated the member is shifted and the shaft rocked.

14. In a steering gear, a casing; an internally threaded sleeve rotatively mounted in said casing; bearings provided within the casing to prevent end motion of said sleeve in said casing; means for adjusting said bearings; a steering rod; and means detachably connecting the rod and sleeve within the casing; with a rock shaft journaled in said casing; a member having one end entered into the sleeve and provided with external threads engaging the internal threads of the sleeve, and having a head; and interengaging ribs on the head and casing to prevent rotation of the head when the sleeve is turned and to guide it in longitudinal motion; whereby when the sleeve is rotated the member is shifted and the shaft rocked.

In testimony that I claim the foregoing as my own, I affix my signature.

DAVID E. ROSS.